United States Patent [19]

Murray

[11] 4,233,008
[45] Nov. 11, 1980

[54] APPARATUS FOR THE MANUFACTURE OF CONCRETE PRODUCTS

[75] Inventor: John A. Murray, Norristown, Pa.

[73] Assignee: U.S. Terrazzo Panels, Inc., Bryn Mawr, Pa.

[21] Appl. No.: 920,270

[22] Filed: Jun. 29, 1978

Related U.S. Application Data

[60] Continuation of Ser. No. 817,263, Jul. 20, 1977, abandoned, which is a continuation of Ser. No. 468,566, May 9, 1974, abandoned, which is a continuation of Ser. No. 317,060, Dec. 20, 1972, abandoned, which is a division of Ser. No. 106,364, Jan. 14, 1971, abandoned.

[51] Int. Cl.³ .............................................. B29C 11/00
[52] U.S. Cl. ...................................... 425/77; 264/57; 264/65; 264/67
[58] Field of Search ................... 425/77; 264/57, 65, 264/67, 333

[56] References Cited
U.S. PATENT DOCUMENTS

| 2,170,936 | 8/1939 | Baron | 425/77 |
| 2,904,893 | 9/1959 | Willey | 425/77 |
| 3,309,835 | 3/1967 | Peppler | 425/77 |
| 3,393,261 | 7/1968 | Herzig et al. | 264/82 |
| 3,468,993 | 9/1969 | Bierlich | 264/82 |

Primary Examiner—Donald J. Arnold
Attorney, Agent, or Firm—Miller & Prestia

[57] ABSTRACT

An apparatus is provided for the manufacture of concrete products in which a mixture comprised of cement, aggregate, a vinyl acetate-dibutyl maleate copolyer and an amount of water sufficient to make a relatively dry mixture is initially compressed into the desired configuration. This compressed-shaped article is then cured in a chamber charged with carbon dioxide gas to provide a fully cured concrete product having excellent physical properties. The apparatus of this invention is especially useful in the manufacture of terrazo panels and the like.

1 Claim, 3 Drawing Figures

APPARATUS FOR THE MANUFACTURE OF CONCRETE PRODUCTS

This is a continuation of application Ser. No. 817,263, filed July 20, 1977 now abandoned which in turn is a continuation of application Ser. No. 468,566 filed May 9, 1974, now abandoned, which in turn is a continuation of Ser. No. 317,060 filed Dec. 20, 1972, now abandoned, which in turn is a divisional application of application Ser. No. 106,364, filed Jan. 14, 1971 and now abandoned.

BACKGROUND OF THE INVENTION

1. Field of the Invention

This invention relates to an apparatus for the manufacture of concrete products. More particularly, this invention is concerned with the manufacture of terrazzo panels and the like.

2. Description of the Prior Art

The term Concrete as it is employed in this specification refers to the stone-like product obtained by blending a cement, aggregates such as sand, gravel, crushed stone and the like, and water together in appropriate amounts, and allowing the mixture to harden and cure. The term Terrazzo as used in this specification refers to a special form of concrete in which the aggregate used is selected so as to impart a decorative effect to the final product when exposed by grinding and polishing. The aggregate used in terrazzo can include, for example, marble dust, marble chips, granite chips, colored stones of various types, broken glass and the like.

In the prior art methods of manufacturing concrete products, the cement, aggregate, additives if any, and water are blended in various ratios. In general, a sufficient amount of water is added to completely hydrate the cement and also impart a degree of fluidity to the blended mixture. The blended mixture is then poured or compacted into a form and allowed to take an initial set. The initial set usually occurs within one-half hour to four hours, depending upon the temperature and the particular concrete mixture employed. The concrete product, after this initial set, is solid, but has very little strength. In order to obtain the maximum strength possible with a given concrete composition using the prior art manufacturing techniques, the concrete is generally allowed to cure for a period of time from several days to several weeks.

The excessively long period of time required for both the initial set, and particularly for the development of the ultimate strength, causes considerable problems in the manufacture of cast concrete products. The concrete mixture must remain in the mold until the product acquires sufficient strength that it will not fall apart when the mold is removed. Furthermore, the concrete product, even after the mold is removed, must be allowed to cure for an extended period of time before it is subjected to any substantial stresses. The need to maintain the concrete products in the mold until the initial set is obtained, and for curing the products until the ultimate strength is developed requires a substantial inventory of molds and a rather large storage area for the products being processed. Of even greater consequence is the cost involved in the prior art processes since the handling of the weak products obtained after the initial set and the storage of the product for several days or weeks until fully cured is quite costly in both manpower and storage space.

The problems encountered in handling and storage of concrete products using prior art processes can best be illustrated by the conventional methods of manufacturing terrazzo panels. In the conventional method a concrete mixture containing the desired type of aggregate is either poured or compacted into a suitable panel mold. The mold is then stored until the mixture initially sets. At this point the panel cannot be ground or polished since the machining would cause the panel to disintegrate, especially if the grinding were conducted at the high speeds required for commercial production of terrazzo panels. Accordingly, the panel has to be stored for days or weeks until fully cured, and then finished.

A further problem encountered with cast concrete products in general, and terrzzo products in particular, is that often, using the prior art processes, products are obtained which lack sufficient compressive strength. In order to compensate for the relatively low compressive strength, the products have to be cast with thicker cross sections so as to provide the required strength. This materially adds to the cost of the product, the cost of transportation of the finished product, and the cost of installing the product. As can be seen most readily with terrazzo panels which are used as floorings in many public buildings and the like, if the panels can be made stronger, thinner sections can be used as these would have the same compressive strength as the weaker, thicker panels. The use of the thinner terrazzo floor panels directly reduces the material cost of the flooring, and indirectly would reduce the total cost of the building, in that the supporting structures for the flooring would not have to be as strong in order to support the lighter weight terrazzo panels.

Attempts have heretofore been made to decrease the cure time in the manufacture of concrete products. These included adding various types of accelerators to the concrete mixtures as well as heating or steaming the concrete products during manufacture. These methods at best produced marginal improvements with regard to reducing the cure time, and were somewhat expensive. For example, in high pressure steam curing the product often had to be steamed for twelve to twenty-four hours in order to obtain a satisfactory hardness and strength in the final product. In addition, certain of the processes had adverse effects on the composition. High pressure steaming of the concrete products containing substantial amounts of marble or limestone, for example, caused a very marked decrease in the ultimate compressive strength of the final product. Accordingly, these processes could not be used with terrazzo products which usually contain substantial amounts of marble dust or marble chips.

In order to increase the strength of concrete products certain additives have heretofore been suggested. These additives include materials which to some extent plasticize the finished concrete product so as to increase its compressive strength. Additives have been suggested to improve the properties of concrete products, including bituminous materials and various types of rubbers and emulsions of synthetic resins. One patent which has been found to be particularly interesting because it is concerned primarily with terrazzo-type concrete products is Murray, U.S. Pat. No. 3,305,506. The Murray patent teaches the use of a vinyl acetate-dibutyl maleate copolymer for improving the compressive strength. It should be noted, however, that while these additives do have a definite beneficial effect on improving the compressive strength, the ultimate compressive strength is still relatively low. This limits the use of concrete products having thin cross sections in applications which require the material employed to carry considerable compressive loads.

It is accordingly an object of this invention to overcome the aforementioned problems and difficulties of the prior art.

It is the more specific object of this invention to provide an apparatus for rapidly curing concrete products.

It is an additional object of this invention to provide an apparatus for producing concrete products with improved strength.

It is a still more specific object of this invention to provide an apparatus for continuously manufacturing terrazzo-type concrete products.

Other objects and advantages of this invention will become further apparent from a study of the attached figures and a continued reading of the specification and subjoined claims.

SUMMARY OF THE INVENTION

Figure 1:
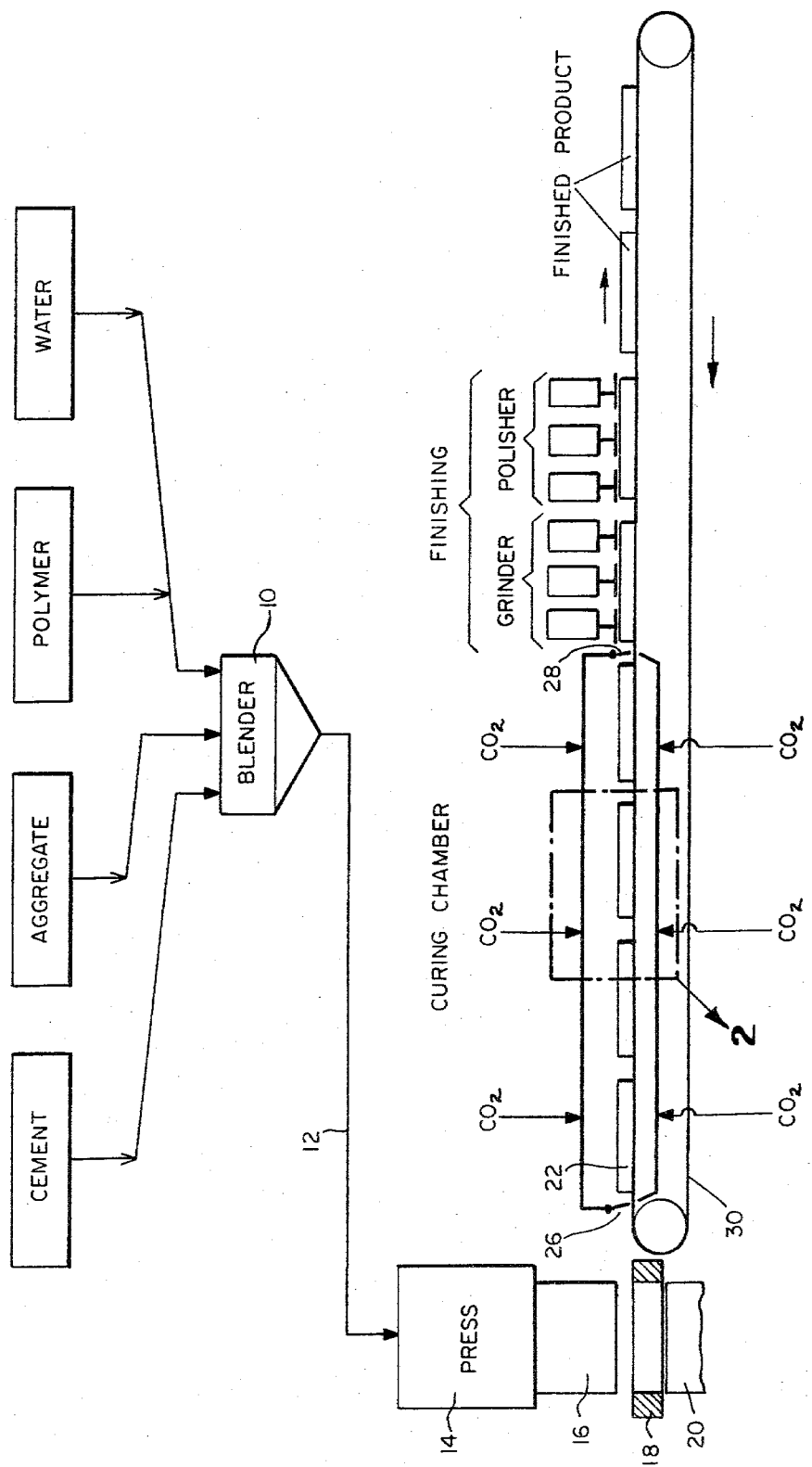
FIG. 1 is a schematic illustration in cross section of an apparatus of this invention which is especially useful for the manufacture of terrazzo panels.

The objects of this invention have been achieved by providing an apparatus wherein cement, the desired aggregate, a vinyl acetate-dibutyl maleate copolymer and a minor amount of water are initially blended. This relatively dry mixture is then compressed into the desired shape in a mold. The shaped article is then fed through a chamber charged with carbon dioxide gas which causes a rapid exothermic reaction to occur during which the article is fully cured in a matter of a few minutes. The cured product exhibits substantially improved physical properties, and in particular, compressive strength as compared to similar products produced in the conventional manner.

DESCRIPTION OF THE PREFERRED EMBODIMENTS

In the present invention the starting mixture is comprised of four principal ingredients, namely, portland cement, aggregate, a copolymer of vinyl-acetate and dibutyl maleate, and water.

The cement which is used can be the common commercially available types. In this specification specific reference will be made to portland cement but it should be appreciated that other similar hydraulic cements can likewise be used in the method of this invention. Portland cement compositions are comprised of about 60–70% by weight of $CaO$, 17–25% by weight of $SiO_2$, 3–8% by weight of $Al_2O_3$, minor amounts of other oxides such as $Fe_2O_3$, $MgO$, $Na_2O$, $K_2O$ and about 1–3% by weight of $SO_3$. As in all concrete-forming processes, it is important that the cement be kept as dry as possible prior to the formation of the starting mixture since the oxides comprising the cement will hydrate in the presence of water, and a weaker product will be obtained if the cement is partially hydrated prior to formation of the shaped article from the mixture.

The aggregate can be selected from an almost unlimited variety of different materials. The most commonly employed aggregates for use in this invention are sand, gravel, marble dust, marble chips, granite dust, granite chips, and crushed limestone. Additional other types of materials which can be advantageously employed as aggregates are seal shells, broken glass, especially colored glasses, and masonry-type building rubble such as crushed concrete, mortar and crushed bricks. As can be seen from the above, the choice of the particular aggregate which can be used in the method of this invention is quite extensive.

The selection of the particular aggregate is dependent on a combination of several factors. These include the physical properties desired in the final concrete product; the decorative effect desired in the final product; and the availability and cost of the aggregate. The particular aggregate or combination of aggregate employed has a marked effect on the ultimate strength of the concrete product. As is well known, neat cement when mixed with water and allowed to set and cure will develop a certain minimal amount of strength. However, when an aggregate is added, the aggregate reinforces the product and results in a product having a considerably higher ultimate strength. The strength of concrete products is dependent to a large extent upon the strength of the aggregate employed, with stronger aggregates resulting in stronger concrete products.

The particle size of the aggregate, or blend of aggregates employed, is likewise quite important. The use of large-size aggregate particles tends to increase the strength of concrete products. However, the use of only a large particle size aggregate can result in a relatively weak product since a considerable volume of air voids will form between the aggregate particles and considerably weaken the product. Accordingly, the use of a combination of relatively fine aggregates and coarse aggregates in the proper balance will significantly enhance the ultimate properties of the final product.

The appearance desired in the final product is another factor to consider in the selection of the aggregate, especially if a terrazzo product is to be produced, since the aggregate will be exposed as a result of finishing. In producing terrazzo, marble dust is most commonly used as the fine aggregate, and marble chips as the coarse aggregate. The color of the marble is varied according to the effect desired in the final product. Terrazzo products, however, are not limited to the use of marble as the sole aggregate. Quite striking effects are obtained with aggregates such as sea shells and broken glass which when ground and polished add distinctive effect to the terrazzo panels.

While this invention is especially well suited to the preparation of the relatively exotic concrete products such as terrazzo panels, it should be appreciated that this invention can also be used to make building blocks and the like. Because of the relative speed and simplicity of the method of this invention, as will be explained in greater detail below, common masonry rubble which is obtained on tearing down an existing structure can be crushed and used as an aggregate to form building blocks for constructing new buildings.

One of the more essential components of the starting mixture of this invention is a copolymer of vinyl-acetate and dibutyl maleate. This particular copolymer appears to have a dual effect in this invention. Initially it makes possible rapid cure of the starting compositions to obtain the final fully cured product. When the copolymer is not included to the mixture, rapid curing is not obtained. Secondly, as disclosed in Murray, U.S. Pat. No.

3,305,506, the copolymer has a definite beneficial effect on the strength of the product. The relative proportion of the monomers comprising the copolymer can be varied considerably and still obtain satisfactory results. The optimum results, however, have been obtained with copolymers which are comprised of about three parts by weight of the vinyl-acetate monomer and one part by weight of the dibutyl maleate monomer. A commercially available copolymer of this type is available which is comprised of about 77% by weight of vinyl acetate and about 23% by weight of dibutyl meleate prepared in emulsion form using polyvinyl alcohol as a protective colloid.

The final essential starting material for the mixtures employed in this invention is water. Water, as is well known to those skilled in the art, is required for hydration of the oxides comprising the portland cement. In the prior art processes, an amount of water had to be used which was at least theoretically required for complete hydration of the oxides comprising the portland cement. In general, a considerable excess was employed in order to compensate for the amount of water required for wetting out of the aggregate and also to provide a somewhat fluid mixture to facilitate the handling of the concrete mixture. As will be pointed out below in greater detail, in this invention a considerably lesser amount than the theoretical amount of water required for complete hydration is employed and, quite surprisingly, a superior product is obtained. The water used in this invention does not require any particular pretreatment providing it is of the ordinary quality generally employed to make concrete.

As was pointed out above, the proportions of the ingredients comprising the starting composition are quite important. The starting mixture should generally contain from about 60–75% by weight of the aggregate which can be a combination of both fine aggregate and coarse aggregate in proportions required for obtaining the desired strength and decorative effect in the final product. The size of the aggregate is selected so that the starting mixture can readily be compressed into a given shaped article, relatively free of voids, with preferably less than 1–4% by volume of voids being present in the compressed product. The mixture further contains from 20–25% by weight of cement.

The two remaining essential components, that is, the copolymer and the water, are present in relatively minor amounts. The vinyl-acetate dibutyl maleate copolymer is present in an amount of from about 1–2% based on the solids contents of the resin.

The total weight of the water in the composition is limited to about 5–10%, and more preferably 4–8%, with optimum results being obtained with about 6% water. In determining the amount of water to be added to the mixture, the water, if any, associated with the aggregate, as for example when wet sand is used, and the water present in the polymer emulsions, must be taken into consideration. The mixture may also contain other additives such as dyes, pigments and the like.

The preferred method of preparing the starting mixture is to initially premix the dry components, that is, the cement and the aggregate, so that a uniform blend is obtained prior to the addition of the liquid ingredients. Then, because of the relatively minor amount of the liquids used, it is preferable to spray the dry mixture with the mixture of the copolymer and water. The mixing is then continued until the total mixture is uniformly blended. The mixture at this point will be relatively dry appearing as compared to the fluid, soupy mixtures generally employed to make concrete poducts. The mixture should have the relatively stiff consistency similar to drained wet sand or the like.

The particular type of blending apparatus employed to obtain the starting mixture is not critical providing it sufficiently blends the starting materials. One type of blender which has, however, proven to be satisfactory is a double screw blender since this provides a very complete mixture of the starting materials in a short period of time. In addition to the blender 10, a screw feed can be provided in the feed-line 12 to both further mix the ingredients of the mixture and also to facilitate the transfer and metering of the mixed material to the press 14.

The press 14 is one of the more essential parts of the apparatus of this invention. It is a high pressure hydraulic press which is capable of exerting over a million pounds of pressure per square yard on the material being compressed. Positioned below the ram 16 of the press 14 is a cavity mold 18. The cavity mold shown is for making flat panels. The cavity mold has high walls in order to receive a sufficient amount of the starting mixture to form a panel of the desired thickness after compression. Associated with the cavity mold 18 is an ejection means 20 for removing the pressed, uncured panel 22 from the cavity mold 18.

The mixed starting material is fed into the cavity mold 16 in a weighed amount sufficient to make a panel of the desired or predetermined thickness or height thickness. The cavity mold 18 is positioned below the ram 16, and the press is activated. The ram 16 compresses the mixture into a compacted panel 22 which has sufficient structural integrity to be removed from the cavity mold by the ejector means 20 without breaking apart. The uncured panel 22 at this point is freestanding and capable of being handles, but it should be appreciated that if dropped or if roughly handled it can be readily broken. The ability to form an unset, uncured panel 22 which does not require the use of a form to maintain its shape during further processing is believed to be due to the combination of the use of the high pressure in the molding process and the presence of the copolymer in the mixture as well as the use of a relatively low amount of water in the mixture. Because the starting material can be formed into the desired shape, and the mold thereafter immediately removed from the shaped article, it is not necessary to maintain a large inventory of molds as was required in the prior art processes.

The uncured panel 22 is advanced into a carbon dioxide chamber 24 (FIG. 2) which is clearly the most important single part of the apparatus of this invention. The chamber 24 should be built so as to be relatively gas tight. Furthermore there should be included flexible seal means 26, 28 at the entrance and exits of the chambers so as to minimize the carbon dioxide losses as the panels 22 enter and leave the chamber 24. As illustrated, the panels 22 are supported by a conveyor belt 30 which is of an open mesh construction in order to permit carbon dioxide gas to pass through the belt and contact the bottom portions of the panels 22 being processed through the chamber 24.

Figure 2:
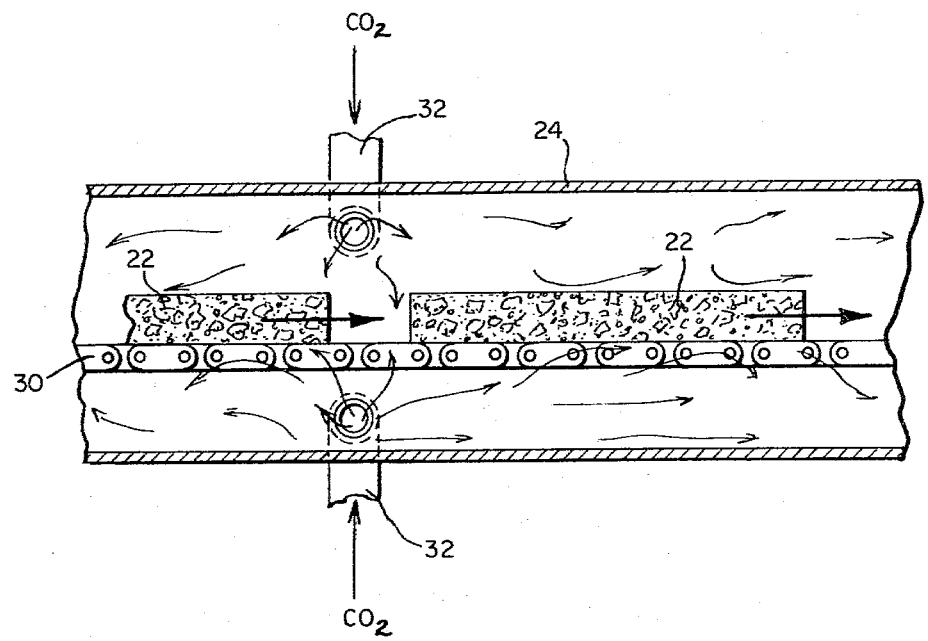
FIG. 2 is an enlarged view of the dotted area 2 of FIG. 1.

Inlets 32 for carbon dioxide gas are provided at both the top and bottom sides of the chamber 24 opposite each other. As illustrated, only three inlets 32 are shown on each side of the chamber. However, it should be appreciated that a considerably larger number of inlets 32 are preferably employed to introduce the carbon dioxide gas into the chamber 24 As shown in FIG. 2, the conveyor belt 30 is disposed in the carbon dioxide chamber spaced above the bottom of the chamber and the bottom side inlet 32 is disposed below the level of the conveyor belt 30.

The relative height of the chamber 24 is a highly critical factor. In order to obtain the maximum benefits of this invention, the chamber 24 should not be excessively large. Preferably the height of the chamber should be at most from 1½–4 times the thickness of the panel being processed. The rate and the depth of the cure is directly dependent upon the chamber height. This was found in test wherein panels were cured under substantially the same conditions with the exception of the height of the curing chamber. It was found that a 1° thick panel would rapidly cure completely throughout its entire volume in a 4° chamber in about 2–5 minutes. It was further found that the same type of panel when fed through a chamber having a considerably greater height, namely, about 18°, would at best skin cure and would have a soft, uncured center portion. Further, as a result of this finding, the height of the chamber was gradually reduced and it was found that the proportion of the uncured center section was directly dependent upon the height of the chamber. As the chamber height was reduced, more of the panel cured until the height of the chamber was reduced to a height wherein the entire thickness of the panel cured. It was further found that even extending the time of cure in chambers having an excessive height had no substantial effect on the degree of cure obtained. The reason for the criticality of the chamber height is no known.

The carbon dioxide can be obtained from any convenient source. Bottled carbon dioxide gas is the most conveniently used in most installations. The gas should be comprised essentially of carbon dioxide with at most minor amount of other gases being present in the carbon dioxide. The pressure of the carbon dioxide which is maintained inside the chamber is not particularly critical, with approximately the same results being obtained with pressures from 1–50 PSIG pressure in the chamber. What is important, however, is that the carbon dioxide be maintained at a sufficient positive pressure that it will prevent the infusion of atmospheric air into the chamber. The composition of the atmosphere inside the chamber 24 should be essentially carbon dioxide. Under ideal conditions the carbon dioxide content of the atmosphere inside the chamber 24 should be at least 95%, and preferably higher, for example 98% plus.

In the invention, as the panel 22 is fed through the chamber 24 charged with carbon dioxide, there is a sudden exothermic reaction wherein the temperature rises about 20°–60° F. depending upon the mixture employed. The exothermic rise occurs in about 1½–5 minutes. The rate of temperature rise then markedly levels off and rises gradually to a maximum temperature which is generally 5°–10° higher above the leveling off point.

Figure 3:
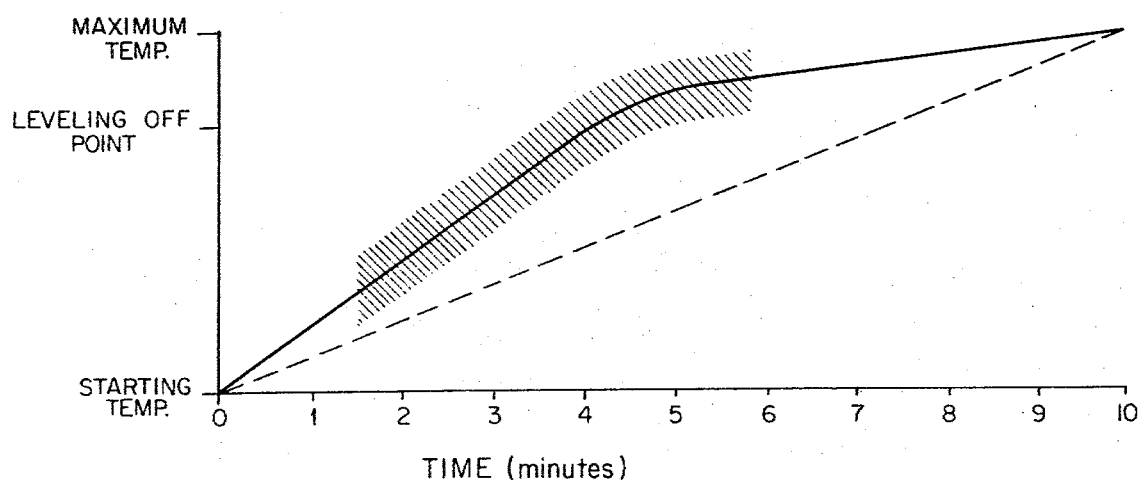
FIG. 3 is a graphic illustration of the temperature rise and time relationship in the method of this invention.

What is highly surprising, as is shown in FIG. 3, is that unless a rapid exothermic temperature rise is obtained with a leveling off point being reached in less than about 5 minutes, a poor, partially cured product is obtained. For example, when using an oversize chamber the temperature rise will be substantially linear as shown by the dotted line on FIG. 3. Approximately the same maximum temperature will be reached in about 10 minutes. However, unlike the sample, which rapidly exotherms, as shown by the solid line on the graph, the samples represented by the dotted line will be poorly cured or simply skin-cured, with a soft, uncured center portion.

It should be noted that the carbon dioxide is an essential reaction in the process of this invention. The rapid exothermic reaction with the resulting rapid cure is not obtained with other gases such as air, oxygen, nitrogen, etc. In addition, it should be further noted that heat alone is not sufficient to cause the rapid cure. When panels of the composition disclosed above are heated by external means to the same temperature as that reached in the carbon dioxide chamber, there is no substantial curing of the panel.

It should be also appreciated that there is a close interrelationship between the amount of water used in the starting mixture, the copolymer employed, and the carbon dioxide. If an amount of water substantially in excess of that defined above is employed, the mixture will not cure in the carbon dioxide chamber. This is believed to be due to a lack of relative solubility of the carbon dioxide in water, and also because the excess water may prevent the carbon dioxide from penetrating into the concrete mixture being cured.

What is even more surprising, as noted above, is that if the vinyl-acetate diutyl maleate copolymer is not included in the mixture, rapid curing will not be obtained. The exact reason the copolymer has to be in the mixture is not known.

A further surprising effect of this invention is that in spite of the fact that a relatively low amount of water is employed in the mixture, often after curing has occurred the cured material will have free water on its surface. This is believed to be due to a combination of interrelated reactions. The initial reaction is believed to be the hydration of the oxides of the cement by the water, which is then followed by a rapid carbonization of the resulting hydroxide by the carbon dioxide. The result is that the hydrate formed on hydration of the oxide is then converted into the corresponding carbonate, and the water initially used in the hydration reaction is freed and can react with additional unreacted oxide. In theory, if both the hydration reaction and the carbonization reaction go to completion, the entire amount of water added to the starting mixture should be recovered as free water. This would, of course, account for the presence of water on the surface of some cured materials. While the above theory appears to be the logical explanation of the chemistry involved, it should be appreciated that applicant does not intend to limit his invention to the above theoretical explanation of the process.

The products obtained in accordance with the method of this invention are quite unique with regard to their physical properties. When identical samples of various concrete compositions were pressed as noted above, and one sample of each composition was cured according to the method of this invention, and the other sample was cured for 28 days in the conventional manner, the samples prepared according to the method of this invention had 2–4 times greater compressive strength. This increase in compressive strength is quite striking and surprising.

The rapid curing with the resulting improved properties has made it possible to continuously manufacture concrete products which are ready for immediate use as soon as they are cured in the carbon dioxide chamber. The advantages of this invention are especially important in the manufacture of terrazzo products. As shown in FIG. 1, the panel 22 immediately after curing can be finished by grinding and polishing. The completed terrazzo panels are made in a matter of minutes, not days or weeks as in the prior art processes. In addition, the panels are superior in all properties to the prior art panels.

This invention has been described wit particular emphasis on the manufacture of terrazo panel products. However, the use of the apparatus of this invention clearly is not limited to the manufacture of terrazzo panels. It can be used to produce a wide variety of different types of concrete products. One use of the apparatus of this invention which is especially promising is on-site manufacturing of building blocks. The apparatus employed in this invention can be made sufficiently mobile that it can be set up in a central location in an area which is to be redeveloped. When old buildings are now torn down, the masonry rubble is generally hauled away at considerable cost and simply dumped as fill in remote areas. However, using the apparatus of this invention, the masonry rubble can be crushed and then used as aggregate in the above-described mixture. The mixture of the masonry rubble, cement, copolymer and water is then pressed into building blocks and cured, as described above, in a carbon dioxide chamber. The blocks are then ready for immediate use in constructing new building in the redeveloped area. Using the apparatus of this invention, the cost of the building materials is substantially reduced, and the recycling of the building rubble also eliminates the problem of hauling away the rubble and disposing it.

The following examples are given by way of further illustration of the present invention are not intended in any way to limit the scope of the present invention beyond that of the subjoined claims. All parts and percentages expressed in the following examples are parts and percentages by weight, not volume, unless otherwise indicated.

EXAMPLE 1

A mixture for manufacturing terrazzo panels was prepared by blending together 21.0 kgs. of #0 cedar green marble chips, 24.5 kgs. of #1 blue and green marble chips, 67.2 kgs. of #75 white marble dust & 32.8 kgs. of portland cement.

The mixture was blended until uniform, and then an aqueous mixture comprised of 3 parts by weight of water and 1 part by weight of the copolymer consisting of 77% by weight of vinyl acetate and 23% by weight of dibutyl maleate was sprayed onto the mixture until the mixture contained 6% water and 2% copolymer, based on a total weight of the mixture.

The mixture was compressed into panels approximately 36"×36" and 1" thick. The panels were virtually free of air voids. The panel was then ejected from the mold and found to have sufficient structural integrity that it retained its pressed shaped after the supporting structure of the mold was removed. However, the panel could readily be reduced to the uncompacted state by simply crushing it with a hammer or the like.

The compressed shaped panel was supported on a chain mesh conveyor belt and fed through a gas chamber having a height of 4". This chamber was charged with carbon dioxide gas introduced into the chamber through a series of orifices positioned approximately 6" apart from each other along both the top and the bottom of the chamber. The pressure of the carbon dioxide in the chamber was maintained at 10 PSIG. The speed of the conveyor belt was set so that the panels to be cured remained in the chamber for 10 minutes.

Heat probes were positioned on the surface of the panels and in the interior of the panels, and the temperature was monitored. The rise in temperature was recorded as follows:

CHART 1

|  | Interior Temperature °F. | Surface Temperature °F. |
| --- | --- | --- |
| 0 minute | 74 | 74 |
| 1 minute | 74 | 74 |
| 2 minutes | 78 | 84 |
| 3 minutes | 128 | 90 |
| 4 minutes | 134 | 97 |
| 5 minutes | 136 | 109 |
| 6 minutes | 139 | 112 |
| 7 minutes | 142 | 113 |
| 8 minutes | 145 | 114 |
| 9 minutes | 147 | 114 |
| 10 minutes | 147 | 115 |

The reason for the substantial difference between the interior temperature and the exterior temperature was believed to be caused by an initial surface cooling of the panel by the freshly introduced carbon dioxide gas. It should be noted, however, that in both temperature measurements there was a sudden exothermic increase in the temperature in about 5 minutes. The temperature leveled off after this initial exotherm, and came to a substantial equilibrium. In similar tests, when the temperatures were monitored for longer periods of time, it was found that the maximum temperature is reached in about 10 minutes. whereupon the temperature gradually starts to decline. This is believed to show that the reaction is substantially completed within 10 minutes or less.

The panels were evaluated for cure by initially testing the hardness. Thereafter the panels were cut in half to determine if the panels were fully cured throughout their entire thickness. The panels cured as above were both very hard and also fully cured throughout their entire thickness. The panels immediately after curing were ground with high speed diamond wheels, using water as the cooling fluid, and then polished. The samples ground very well. The surface of the panels was examined and it was found that there was no erosion of the cement from between the aggregate particles as is encountered with poorly cured panels.

EXAMPLE 2

The terrazzo mixture described above was compacted and the panel was then stored for 4 weeks at 70° F. This sample was then evaluated and was found to be relatively weak. On grinding, the cement eroded from the samples, indicating that the cement was at best only partially hydrated. The above procedure was repeated with the exception that the amount of water was doubled from 6 to 12%. The sample, after 4 weeks of aging, was considerably stronger than the sample produced with 6% water. However, it still had only about ⅓ the compressive strength of the sample produced in Example 1.

EXAMPLE 3

Example 1 was repeated, with the exception that the vinyl-acetate dibutyl maleate copolymer was omitted from the mixture. The panel when monitored during the carbon dioxide treatment did not show any exotherm. The sample after 10 minutes in the carbon dioxide chamber was removed and evaluated. The sample had not cured and could readily be broken.

EXAMPLE 4

A panel of the composition described in Example 1 was heated between a pair of electrically heated plates until the interior temperature reached 147° F. which is the maximum temperature reached in Example 1. This sample was then evaluated and it was found that it was not cured, which indicated that temperature alone is not involved in the curing process of the present invention.

EXAMPLE 5

The procedure for Example 1 was followed, except that the height of the carbon dioxide chamber was adjusted to 18". The temperature was again monitored. The surface temperature followed an approximately linear rise; the interior temperature only rose slightly. When evaluated, the samples were found to be skin-cured about ⅛" deep from both sides, and the interior of the sample was soft and completely uncured.

The height of the chamber was gradually reduced 2" at a time, and samples were evaluated at each height. As the height was reduced, the amount of the uncured center portion likewise was reduced, until at about 4° a fully cured panel was obtained.

EXAMPLE 6

The procedure of Example 1 was repeated, except that the following mixture was used: 38 kgs. quartz crystal dust, 92 kgs. 50 mixed cedar green and light green marble chips, 38 kgs. marble dust & 70 kgs. portland cement. The temperature was monitored as in Example 1 and was found to be as follows:

CHART 2

| | Interior Temperature °F. | Surface Temperature °F. |
|---|---|---|
| 0 minutes | 69 | 74 |
| 1 minute | 74 | 74 |
| 2 minutes | 74 | 82 |
| 3 minutes | 123 | 89 |
| 4 minutes | 131 | 97 |
| 5 minutes | 136 | 103 |
| 6 minutes | 139 | 108 |
| 7 minutes | 142 | 110 |
| 8 minutes | 144 | 111 |
| 9 minutes | 146 | 112 |
| 10 minutes | 147 | 112 |

The panels were fully cured and very hard. Some difficulty was encountered in grinding because of the exceptional hardness of the quartz particles.

EXAMPLE 7

The procedure of Example 1 was repeated except that the following mixture was employed: 23.6 kgs. #0 white marble chips, 21 kgs. ground limestone, 21 kgs. #75 marble dust. 25.2 kgs. portland cement & 7 kgs. of a 3:1 mixture of water, and the copolymer of Example 1. The panels were cured in the manner described in Example 1. The temperature readings at the interior of the samples were taken and were found to be as follows:

CHART 3

| Time | Temperature °F. |
|---|---|
| start | 67 |
| ½ minutes | 68 |
| 1 minutes | 74 |
| 1½ minutes | 79 |
| 2 minutes | 86 |

CHART 3-continued

| Time | Temperature °F. |
|---|---|
| 2½ minutes | 93 |
| 3 minutes | 103 |
| 13½ minutes | 110 |
| 4 minutes | 115 |
| 4½ minutes | 120 |
| 5 minutes | 125 |
| 5½ minutes | 130 |
| 6 minutes | 134 |
| 6½ minutes | 138 |
| 7 minutes | 140 |
| 7½ minutes | 143 |
| 8 minutes | 146 |
| 8½ minutes | 147 |
| 9 minutes | 149 |
| 9½ minutes | 150 |
| 10 minutes | 152 |

The samples were fully cured and very hard. The panel ground easily, and the surface was exceptionally smooth.

EXAMPLE 8

Example 7 was repeated except that in place of maintaining the carbon dioxide pressure at 10 PSIG, the pressure of the carbon dioxide within the chamber was raised to 60 PSIG. The interior temperature during cure were recorded and found to be as follows:

CHART 4

| Time | Temperature °F. |
|---|---|
| 0 minutes | 68 |
| ½ minutes | 82 |
| 1 minutes | 93 |
| 1½ minutes | 102 |
| 2 minutes | 120 |
| 2½ minutes | 134 |
| 3 minutes | 142 |
| 3½ minutes | 146 |
| 4 minutes | 149 |
| 4½ minutes | 151 |
| 5 minutes | 152 |
| 5½ minutes | 153 |
| 6 minutes | 153 |
| 6½ minutes | 153 |
| 7 minutes | 153 |
| 7½ minutes | 153 |
| 8 minutes | 153 |
| 8½ minutes | 153 |
| 9 minutes | 153 |
| 9½ minutes | 153 |
| 10 minutes | 154 |

The panel after curing was found to be completely cured and hard. It was equivalent to the panel produced in Example 7.

EXAMPLE 9

Building blocks were prepared from the following mixture: 20 kgs. crushed concrete, 22 kgs. crushed burnt face brick, 25 kgs. ground limestone, 25 kgs. portland cement, 2 kgs. vinyl acetate-dibutyl maleate copolymer, 6 kgs. water. The mixture was prepared as in Example 1 and pressed into blocks 8"×12"×2½" thick. The blocks were cured at 10 PSIG in a 4"-high carbon dioxide chamber for 10 minutes. The blocks were found to be fully cured and could be used immediately for the formation of walls or the like in a building.

I claim:

1. In an apparatus for manufacturing terrazzo concrete products from a moist mixture containing copolymeric additive and which mixture is compressed to form uncured free-standing shaped members of predetermined height and then cured in a dry atmosphere essentially consisting of carbon dioxide, a carbon dioxide chamber constructed to be relatively gas tight and having an entrance and an exit provided with flexible seal means adapted to allow passage of said shaped members while maintaining the carbon dioxide content of the atmosphere within said chamber to about at least 95%, the improvement which comprises the height of said chamber being in the range of 1½ to 4 times the predetermined height of said shaped members.

* * * * *